March 29, 1966  A. P. SWART  3,242,958
PEANUT SHELLER
Filed Nov. 19, 1963
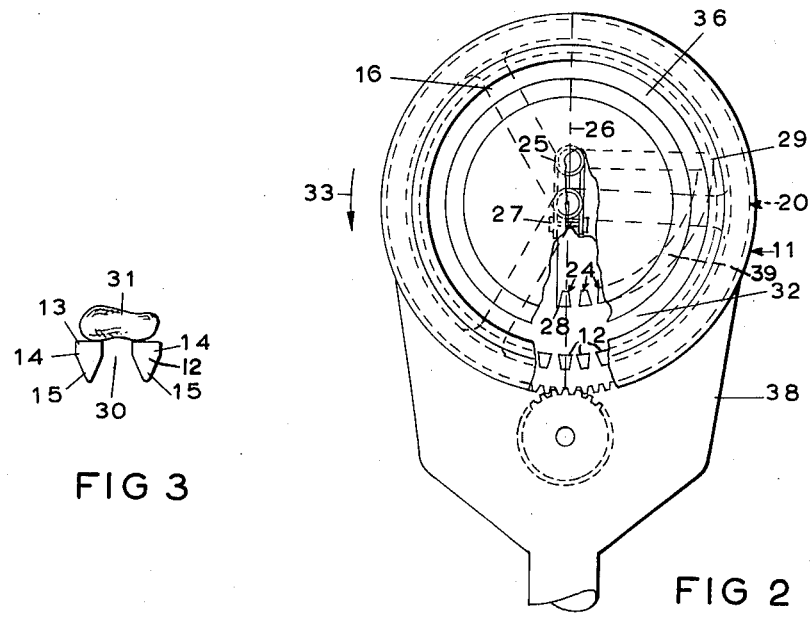
FIG 3
FIG 2
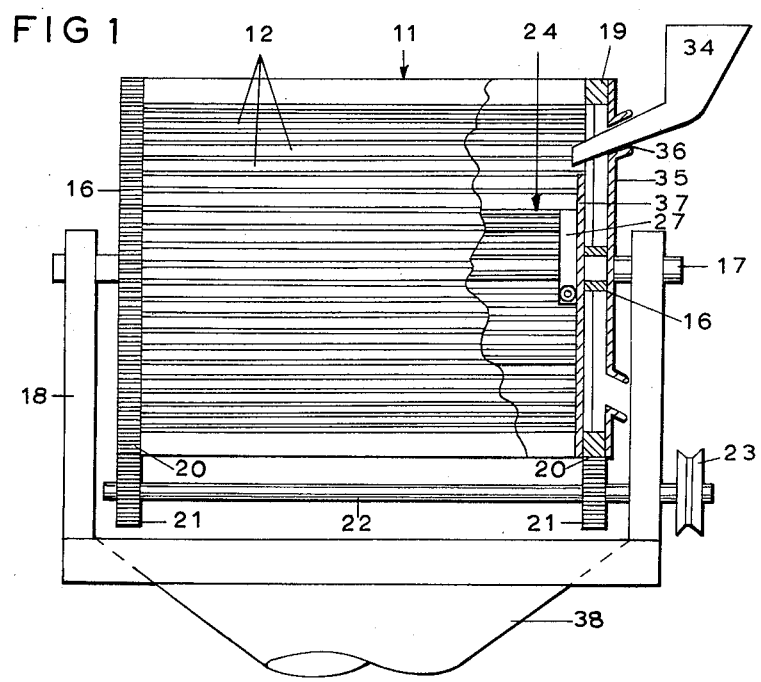
FIG 1

United States Patent Office 3,242,958
Patented Mar. 29, 1966

3,242,958
PEANUT SHELLER
Andries Pieter Swart, Lichtenburg, Transvaal, Republic of South Africa, assignor to Noord Westelike Koöperatiewe Landboumaatskappy BPB, Lichtenburg, Transvaal, Republic of South Africa
Filed Nov. 19, 1963, Ser. No. 324,737
Claims priority, application Republic of South Africa, Nov. 23, 1962, 62/4,927
6 Claims. (Cl. 146—11)

This invention relates to a sheller for peanuts.

The shells of peanuts are brittle and form a pod in which the kernels rest but from which they are separated naturally. Each kernel is divided but the halves are wrapped together in a loose thin friable sheath. It is required to remove the kernels from their shells but without breaking or removing the sheaths so that the kernels are not divided, or, as it is termed, split. In shelling peanuts it is the object to separate the kernels but to have the minimum number of splits.

In accordance with this invention a machine for shelling peanuts comprises an assembly of a number of straight bars forming a circular drum rotatable on a horizontal axis, an assembly of bars forming a segmental portion of a similarly constructed, but smaller, drum mounted eccentrically in the rotatable drum and means for rotating the latter.

Other features of the invention provide for the space between the bars to be limited to restrict the passage of unshelled nuts but with the bars shaped to facilitate the passage of material passing through said spaces and means for clamping the assembly of bars inside the drum in positions to meet shelling requirements in the case of separate supplies of peanuts of different sizes or shapes.

One preferred form of the sheller according to this invention is illustrated in the accompanying drawings.

FIG. 1 is a front view of the sheller partly in section,
FIG. 2 is an end view of FIG. 1 with part of the end cover plates broken away, and
FIG. 3 shows a detail.

As shown the sheller is in the form of a drum 11 made up of a circle of spaced bars 12.

Each bar 12 is the length of the required drum 11 and is preferably made of hard steel. In cross-section the bar 12 is flat on face 13 (FIG. 3) which is mounted to face towards the centre of the drum 11 with the two sides 14, for a short distance, normal to the flat side 13, and thereafter the sides 15 of the bars 12 are inclined towards one another.

The drum 11 is mounted on spiders 16 or the like to rotate on a horizontal shaft 17 supported on brackets 18 and may be driven in any suitable manner. However in the drawings the spiders 16 form the centre of rings 19 which carry the bars 12. The peripheries of the rings 19 are in the form of gear wheels 20 adapted to mesh with the geared pinions 21 on the shaft 22 which is driven by the pulley 23.

Mounted inside the drum 11 is an assembly 24, of bars 12, shaped as a segmental part of a circular drum but smaller in diameter than the main or outside drum 11.

This internal assembly 24 has bars 12 similar in shape to the bars 12, already described, but with their flat sides 13 turned outwardly away from the centre of the drum 11. The assembly 24 is so mounted that its central supporting shaft 25 may be moved along a vertical diameter 26 of the rotatable drum 11, while the portion of the quarter-circle forming the assembly 24, may be rotated and clamped by clamps 27 in position with its bottom edge 28, or top edge 29, on the vertical diameter 26 of the outside drum 11, or anywhere between these two positions. The double curved lines 39 represent the outline of the bars of the inner assembly 24 which is clamped by clamps 27 in an angular position in which, the bottom edge 28 is located on the vertical diameter 26 of drum 11.

The spaces 30 (see FIG. 3) between adjacent bars 12 will not allow normal unshelled peanuts 31 to pass through. The somewhat sickle-shaped space 32 between the bars 12 of assembly 24 and the bars of drum 11 is on an average greater than four or five times the diameter of an ordinary unshelled peanut 31.

In operation the drum 11 is rotated in the direction of the arrow 33 to carry peanuts, loaded therein, up into the narrowing space 32 between the rotating inner wall of the drum 11 and the bars 12 in the stationary assembly 24. The speed of rotation of the drum 11 is never sufficient to carry the nuts 31 around by centrifugal force.

Owing to the fixing of the bars 12 of the inner assembly 24 eccentrically, with the bars 12 forming the wall of the drum 11, the space 32 between the two lots of bars 12 decreases upwardly as shown by the dotted lines 39. The result is that owing to the crush of nuts 31 increasing in the said space 32 the nuts 31 are gently pushed against the edges 14 and into the spaces 30 between the bars 12. The shells of the peanuts 31 are broken against the edges 14 and in rubbing contact with the other nuts 31 in the crush. The thin brittle nature of the shell of the nuts 31 making for easy breakage.

As soon as the shell of the nut 31 is broken, the broken parts of the damaged pod fall through space 30 between the bars 12, often carrying the kernels inside the broken pods with them, so that in the fall the kernels roll out of the pods with their sheaths unbroken. Under such conditions there is a minimum number of splits.

Any broken nuts 31 carried in the space 32 between the assembly 24 and its top 29 will flow over said top 29 and will meet the charge of nuts in the drum 11 and, with their shells already broken, will drop easily through the spaces 30 in the wall of the drum 11. By clamping the inside assembly so that its lower edge 28 is in line with the vertical diameter 26 of the drum 11 a greater amount of nuts 31 is lifted into the space 32 between the two sets of bars 12 in drum 11 and assembly 24. In the reverse setting of assembly 24 less nuts will be picked up but in the shelling operation they may be crushed tighter. In this manner the shelling process can be adjusted to suit the condition of the nuts being handled.

In the example of the sheller illustrated the peanuts are fed into the drum 11 from a chute 34. On the outside of drum 11 spaces (not shown) between the legs of the spiders 16 are closed with end plates 35. Said plates 35 at one end of drum 11 have an annular projecting entrance channel 36. Inside the drum 11 the annular open channel 36 is covered when in the lower part of drum 11 by a plate 37 which is fastened to the nonrotating assembly 24.

The nuts 31 are thereby prevented from escaping from the inside of drum 11. The shells of the nuts 31 are easily crushed and broken up. The kernels being loose in the pod readily drop out. It is therefore obvious that the edges at the top of the sides 14 of the bars 12 are effective in breaking up the shells of the nuts 31 when they are pushed against them in the gradual restricting space 32, so that the broken shells and the kernels drop through spaces 30 together. In this way the broken shells form a cushion for the kernels as they collect in trough 38 below drum 11. It is of course an easy matter to pass the product of the sheller over sieves and the like (not shown) to remove the broken shells from the kernels or shelled peanuts.

The best work is done by the sheller when the sides 14 of the bars 12 have a sharp edge. Although the bars 12 are made of hard metal, they become blunt in time, and when the edge on side 14 becomes worn on the one side the assembly 24 may be taken out of drum 11 and put back in the reverse position. The rotation of the drum 11 will allow the bars 12 to operate on the opposite side, that is, with the opposite or unworn edge 14 presented to the nuts 31 to be broken.

What I claim as new and desire to secure by Letters Patent is:

1. A sheller for peanuts comprising a drum having a circular wall constituted by an assembly of bars, a pair of rings forming the peripheries of spiders, said bars having ends anchored in said rings, a central stationary horizontal shaft rotatably supporting the spiders thereon, a second assembly of similar bars mounted inside said drum, said second assembly forming a segment of a circle with a diameter smaller than the diameter of the drum, a bracket adjustably secured in eccentric relation with respect to the drum shaft, a stationary shaft secured in said bracket, said second assembly being mounted on said stationary shaft to form a sickle shaped passage between the inside wall of the drum and the second assembly of bars, said sickle shaped passage being variable in size by varying the eccentric position of the bracket, said bars being of substantially triangular shape in cross-section and being mounted in said drum and said second assembly with their bases opposite one another.

2. A sheller for peanuts as claimed in claim 1 in which said triangular bars have their bases thickened to provide sharp edges at the base normal to the surface of the base.

3. A sheller for peanuts as claimed in claim 1 comprising end plates for the drum, an annular opening in at least one of said plates providing a passage for entry of the nuts into the drum.

4. A sheller for peanuts comprising a rotatable drum formed with a circular wall of bars, said bars having a triangular shape in cross-section and being mounted with the bases of the triangles facing towards the inside of the drum and in spaced relationship to prevent the passage between them of an unbroken peanut, an internal assembly of bars similar to those forming the wall of the drum and mounted in adjustably fixable position within the drum with their bases opposite the bases of those in the wall of the drum, said internal assembly being mounted to form an arc of a circle having a smaller diameter than the diameter of the drum, said assembly being placed eccentrically with respect to the inner surface of the drum, means for adjusting the position of the internal assembly within the drum to vary the eccentrcity thereof and means for feeding peanuts into the drum and for rotating the drum to bring said peanuts continuously into the space between the said fixed internal assembly of bars and the rotating inner surface of the drum.

5. A sheller for peanuts comprising a rotatable drum formed with a circular wall of bars of triangular shape in cross-section and with the bases of said triangles facing towards the center of the drum, said bars being in spaced relation to define spaces between the bases of said bars which are smaller in extent than the diameter of the unbroken peanuts, but greater than the kernels or broken shells and a second assembly of bars fixedly mounted in adjustable relation eccentrically in said drum and forming a sickle shaped passage for the nuts carried on the internal surface of the rotating drum.

6. A sheller for peanuts comprising a rotatable drum including a plurality of spaced bars in circumferential arrangement, said bars including flat base portions facing inwardly in said drum and outwardly tapering portions, an internal assembly of spaced bars mounted eccentrically within said drum and defining with the bars of said drum a passage of sickle shape, said bars of the internal assembly being substantially identical to the bars of the drum and having their base portions in facing relation with the base portions of the bars of the drum, means for adjusting the relative eccentric position of said internal assembly and said drum to vary the size of said sickle shape passage, means for feeding peanuts to be shelled into the drum for passage into the sickle shaped passage, and means for securing the internal assembly in fixed position within the drum.

References Cited by the Examiner
UNITED STATES PATENTS

| | | | |
|---|---|---|---|
| 567,736 | 9/1896 | Cope. | |
| 941,686 | 11/1909 | Newland | 130—30 |
| 2,543,537 | 2/1951 | Smith | 146—11 |

ROBERT C. RIORDON, *Primary Examiner.*

J. SPENCER OVERHOLSER, *Examiner.*

W. G. ABERCROMBIE, *Assistant Examiner.*